United States Patent [19]

Struger et al.

[11] 4,200,915
[45] Apr. 29, 1980

[54] PROGRAM LOADER FOR PROGRAMMABLE CONTROLLER

[75] Inventors: Odo J. Struger, Chagrin Falls; Valdis Grants, Lyndhurst; Raymond A. Grudowski, South Euclid, all of Ohio

[73] Assignee: Allen-Bradley Company, Milwaukee, Wis.

[21] Appl. No.: 893,252

[22] Filed: Apr. 5, 1978

[51] Int. Cl.[2] .............................................. G06F 9/00
[52] U.S. Cl. .................................... 364/900; 364/101
[58] Field of Search .............. 364/101, 107, 115, 120, 364/200 MS File, 900 MS File

[56] References Cited

U.S. PATENT DOCUMENTS

| | | | |
|---|---|---|---|
| 3,668,653 | 6/1972 | Fair et al. | 364/200 |
| 3,737,861 | 6/1973 | O'Neill et al. | 364/200 |
| 3,771,134 | 11/1973 | Huettner et al. | 364/200 |
| 3,944,984 | 3/1976 | Morley et al. | 364/107 |
| 3,970,830 | 7/1976 | White et al. | 364/101 |
| 3,982,230 | 9/1976 | Burkett et al. | 364/900 |
| 4,003,033 | 11/1977 | O'Keefe et al. | 364/200 |
| 4,034,354 | 7/1977 | Simmons | 364/900 |

Primary Examiner—Mark E. Nusbaum
Assistant Examiner—E. Chan
Attorney, Agent, or Firm—Quarles & Brady

[57] ABSTRACT

A microprocessor based program loader is connected to the memory data bus and memory address bus of a programmable controller. The program loader is responsive to commands entered through a keyboard to load and edit the programmable controller control program. A mode switch associated with the programmable controller provides a number of selectable positions which determine the mode of operation of the programmable controller and the functions that can be performed by the program loader. One of the positions on this mode switch enables the program loader through a control line to assume control of the mode selection. The operator can thus control the mode of operation through the program loader keyboard which may be located remotely from the programmable controller.

11 Claims, 10 Drawing Figures

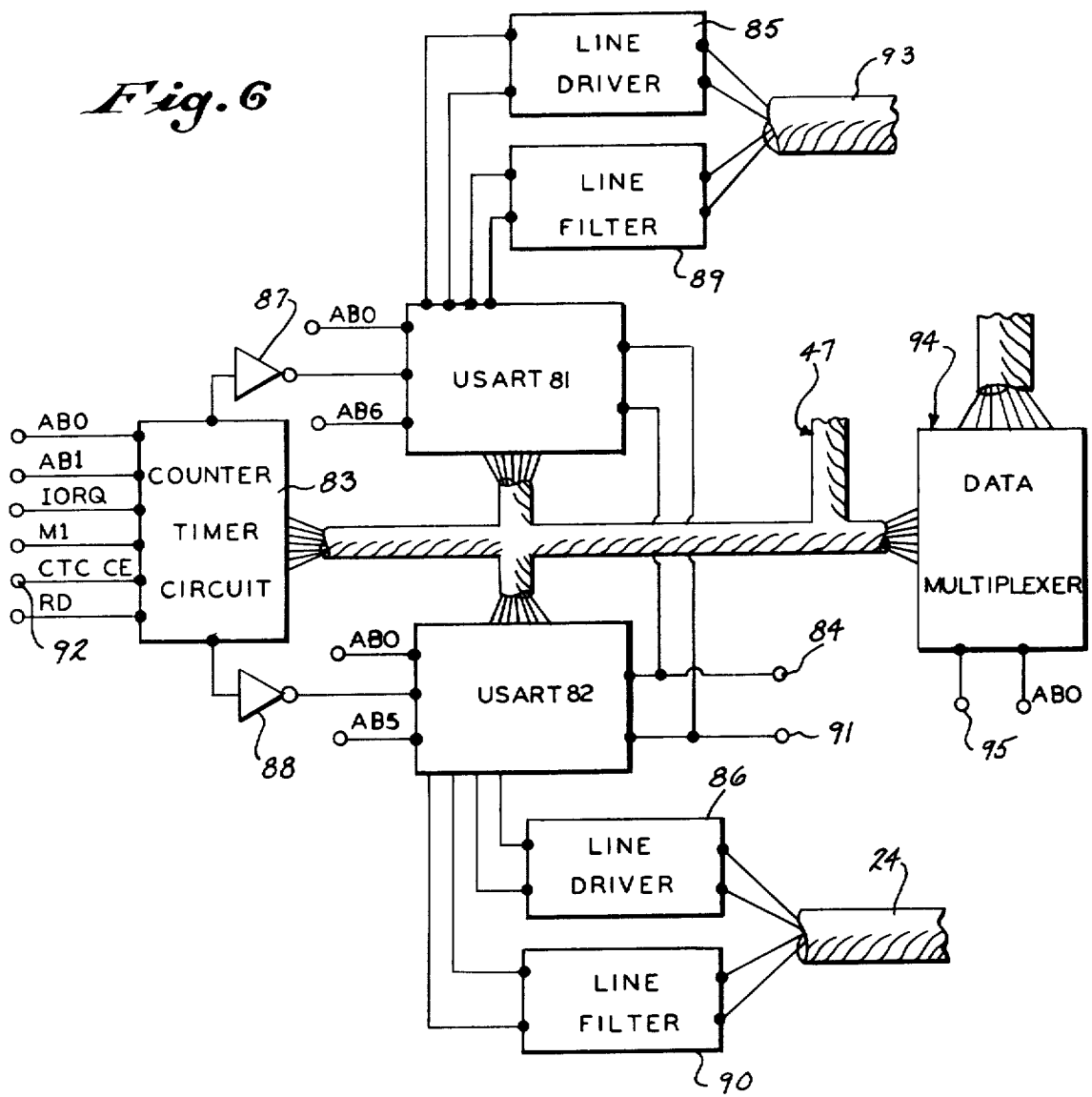

PROGRAM LOADER FOR PROGRAMMABLE CONTROLLER

BACKGROUND OF THE INVENTION

The field of the invention is programmable controllers, and particularly, means for loading and editing programs for controllers such as that disclosed in U.S. Pat. No. 3,810,118 entitled "Programmable Matrix Controller" and that disclosed in U.S. Pat. No. 3,942,158 issued Mar. 2, 1976 and entitled "Programmable Logic Controller."

Controllers such as those described in the above cited patents perform complex control jobs in accordance with a stored program. The stored program is a set of instructions which directs the controller to examine the condition of various sensing, or input devices such as switches and photoelectric cells, compare these conditions to the conditions specified in the stored program, and accordingly, direct the controller to energize or deenergize selected output devices such as motors, solenoids and lights. Although suitable programs may be developed and loaded directly into the controller, in practice such initial programs must first be used on the job site to correct unforeseen problems which inevitably occur. To this end, program loaders such as that disclosed in U.S. Pat. No. 3,798,612 entitled "Controller Programmer" and that disclosed in U.S. Pat. No. 3,813,649 entitled "Controller Program Editor" have been developed to facilitate the loading and editing of such programs. Such program loaders are separate instruments which are temporarily connected to the programmable controller to allow the entry and manipulation of the control program instructions. When the programmable controller has been successfully programmed and the controlled machine is operating properly, the program loader is disconnected therefrom and may be used to program another system.

As disclosed in U.S. Pat. No. 3,997,879 issued on Dec. 14, 1976 and entitled "Fault Processor for Programmable Controller with Remote I/O Interface Racks," programmable controllers are sometimes used in situations in which a large number of sensing devices and operating devices are located remotely from the controller processor. In such situations one or more I/O interface racks may be located at the remote site and coupled to the controller processor as described in U.S. Pat. No. 3,997,879. When editing the control program associated with these remotely located sensing and operating devices it is advantageous to observe their operation, particularly when control program editing is being done while the machine is operating. Accordingly, the program loader must also be located remotely from the controller processor which stores and executes the control program.

Also, even at installations where the controller processor is located immediately alongside the machine being controlled, it is often desirable to perform the programming and editing functions from a remote location. Such a remote location might be, for example, a clean, quiet room which is removed from the industrial environment.

SUMMARY OF THE INVENTION

The present invention relates to a program loader for a programmable controller which can be located remotely from the controller processor and which can control the mode of operation of the system. More specifically, the present invention includes switch means located at the controller processor for selecting the mode in which the system is to operate, one of which selectable modes enables the program loader to also select the mode of operation; and the program loader includes means for sensing the mode of operation indicated by the switch means and it includes means for selecting the operating mode when said one mode is indicated by the switch means at the controller processor.

A general object of the invention is to enable mode selection from the program loader. The mode selection switch at the controller processor can be manually set to any one of the possible modes of operation. In addition it can be set to a RUN/PROGRAM LOAD mode which enables the same mode selections to be made from the program loader.

Another object of the invention is to control those who have access to enter and change the stored control program. The ability to enter programs, change programs, change stored data and monitor the operation of the system at the program loader is determined by the mode of operation. This can be controlled solely at the processor mode selector switch, or in the alternative, it can be controlled at the program loader by setting the processor switch to RUN/PROGRAM LOAD. Access to the processor mode selector switch can be controlled by locking the enclosure which houses it or by using a keylock switch.

Yet another object of the invention is to enable the user of a program loader to load and edit a control program from a location which is remote from the controller processor and to enable the user to control the system's mode of operation from the remote location or at the processor.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 6 is a schematic diagram of the communications circuit which forms part of the program loader processor of FIG. 2;

FIG. 7 is a pictorial view of the keyboard which forms part of the program loader of FIG. 1.

DESCRIPTION OF THE PREFERRED EMBODIMENT

Figure 1:
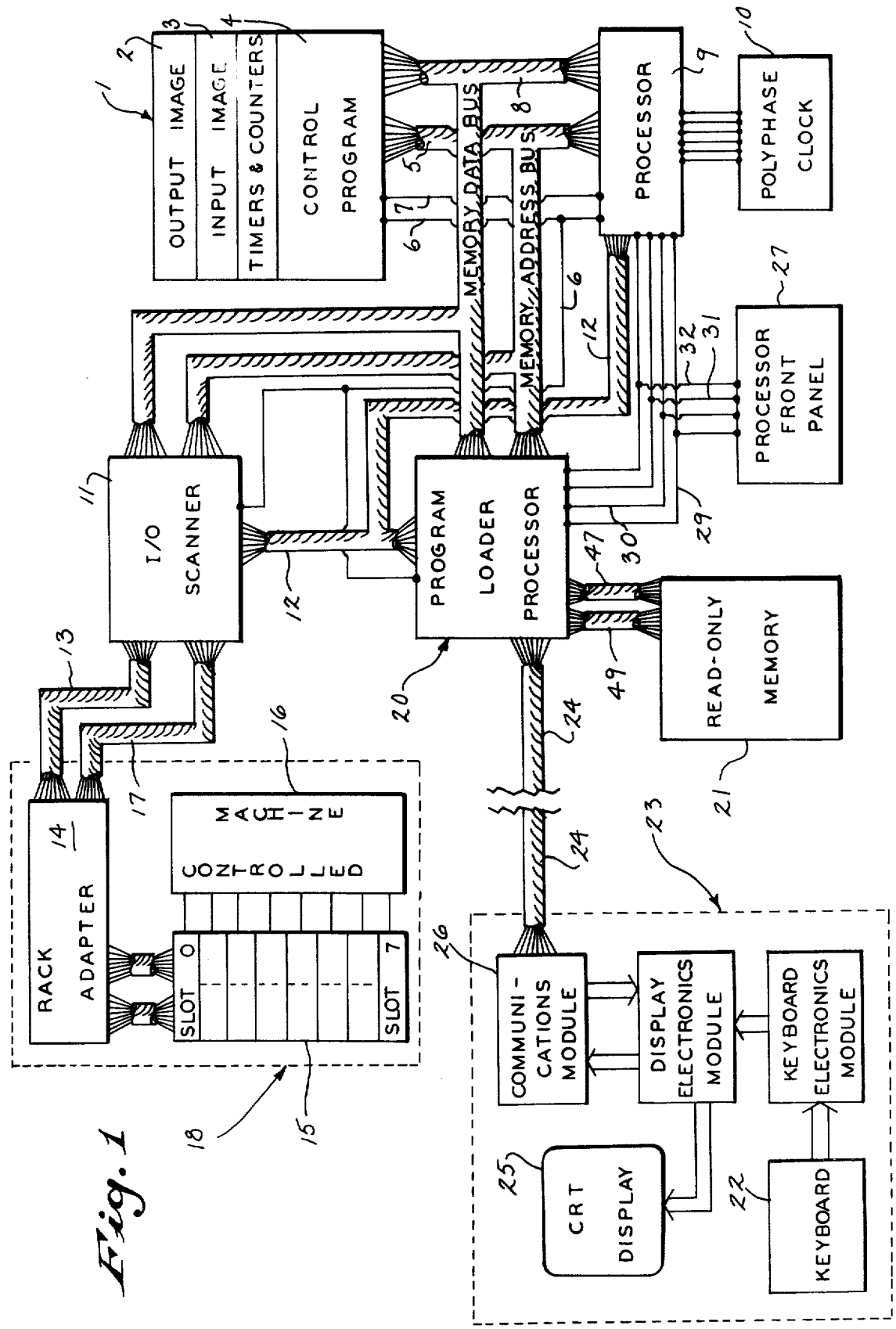
FIG. 1 is a block diagram of a programmable controller with attached program loader.

There are a number of commercially available programmable controllers which operate to examine the condition of various input devices, compare these conditions to the conditions specified in the instructions of a stored program, and accordingly, energize or deenergize selected output devices. These controllers may vary in the number of input and output devices they can control and in the number of operations which they can be directed to perform. Despite these many variations, all controllers include a stored program which is comprised of a series of instructions that are repeatedly read out of a memory in sequence. Each instruction includes an operation code which determines the function to be performed by the controller and an I/O address code which determines the particular input or output device concerned.

The preferred embodiment of the invention is incorporated in a controller program loader for a programmable controller such as that disclosed in the above cited U.S. Pat. No. 3,942,158 entitled "Programmable Logic Controller." Referring particularly to FIG. 1, the programmable controller includes a random access read/write memory 1 which has an eighteen-bit word length and which includes from 4,096 to 12,288 separately addressable lines depending upon the size of the control program which it is to store. Two bits in each word stored in the memory 1 are used for parity checking, and thus, sixteen data bits are stored on each line of the memory 1. An output image table 2 is stored in the first sixty-four lines of the memory 1 and each line is separately addressable with the octal addresses 000–077. An input image table 3 is stored on the next sixty-four lines of the memory 1 and each line is separately addressable with the octal addresses 100–177. Preset and accumulated values of counters and timers are stored on the next 128 lines of the memory 1 and are addressable with the octal addresses 200–377, and the remaining lines of the memory 1 contain a control program 4 in which program instructions are contained and are separately addressable with octal addresses of 400 or greater.

Selected data is read from the memory 1 by applying the proper octal address to a memory address bus 5 and applying a logic low voltage to a read/write line 6. The memory 1 is cycled by applying a logic low pulse to a memory cycle line 7 and the addressed word is read out on a memory data bus 8. A word is loaded, or written into a selected line of the memory 1 by applying the octal address of that line to the memory address bus 5, applying a logic high voltage to the read/write line 6 and applying a logic low voltage pulse to the memory cycle line 7. The sixteen-bit data word appearing on the memory data bus 8 during the one-microsecond cycle time of the memory 1 is written into the selected line of the memory 1.

The control program 4 is executed by a controller processor 9 which connects to the memory buses 5 and 8 and to the control lines 6 and 7. In response to one-megahertz clock pulses generated by a polyphase clock 10, the controller processor 9 continuously and sequentially reads out the instructions of the control program 4 from the memory 1, and in response to an operation code contained within each program instruction, it performs the operation necessary to carry out the controller functions. Such operations include, for example, examining a status bit in the input image table 3 or setting a status bit in the output image table 2 to a desired state.

Each status bit in the output image table 2 corresponds with an operating device such as a motor starter or solenoid on a system being controlled, and each status bit in the input image table 3 corresponds with a sensing device such as a limit switch or a photoelectric cell on the controlled system. This correspondence is achieved by connecting all of the sensing and operating devices on the system being controlled to separately addressable input and output circuits in programmable controller interface racks, one of which is indicated at 18. Each status bit of the input image table 3 is periodically updated by coupling the status of the corresponding sensing device on the controlled system to the memory 1. This is performed by an I/O scanner circuit 11 which also periodically updates the status of the output devices on the controlled system by coupling the current state of each status bit in the output image table 2 to the programmable controller output circuits. The I/O scanner circuit 11 connects with the processor 9 through a set of control lines indicated collectively at 12 and it also connects directly to the memory data bus 8, the memory address bus 5, and the read/write line 6. The scanner circuit 11 periodically couples the memory data bus 8 to an I/O data bus 13 which connects to rack adapters 14 in interface racks 18. Each rack adapter 14 connects to eight separately addressable I/O slots 15, each of which includes sixteen addressable input or output circuits that connect to the operating and sensing devices on the controlled machine 16. An I/O address bus 17 connects the rack adapters 14 to the scanner circuit 11, and each rack adapter 14 includes decoding circuitry which is responsive to three bits in the six-bit address code on the bus 17 to enable the interface rack when its rack number is detected. Each rack adapter 14 also includes decoding circuitry which is operable to enable one of the slots 0–7 in response to the three remaining bits on the I/O address bus 17.

The I/O scanner circuit 11 periodically "steals" a memory cycle from the processor 9 to read a sixteen-bit word in the output image table 2 of the memory 1 and couple that word through the I/O data bus 13 to a selected rack and slot which is identified by an address on the I/O address bus 17. Also, the scanner circuit 11 periodically reads the status of sixteen input circuits in an addressed slot 15 and couples the sixteen-bit data word to an addressed line in the input image table 3 of the memory 1. Thus, by periodically stealing a memory cycle from the processor 9, the I/O scanner circuit 11 updates the input image table 3 with the current status of the sensing devices on the controlled machine 16, and periodically updates the state of the operating devices on the controlled machine 16 by coupling the current status of the output image table 2 to the proper rack adapter 14. The I/O scanner 11 and rack adapter 14 may be constructed to allow the adapter 14 and associated I/O circuits 15 to be located remotely from the other elements of the programmable controller as described in the above cited U.S. Pat. No. 3,997,879.

The controller program loader interacts with the controller processor 9 and the read/write memory 1 on a similar "cycle steal" basis. Referring particularly to FIG. 1, the controller program loader includes a program loader processor 20 which connects to the memory address bus 5, the memory data bus 8, the control lines 12 and the read/write line 6. As will be described in more detail hereinafter, the program loader processor 20 includes a microprocessor which operates in response to machine instructions stored in a read-only memory 21 to perform a number of functions.

One of the primary functions of the program loader processor 20 is to load the control program 4 into the controller memory 1. The control program instructions are entered through a keyboard 22 that forms part of a display terminal 23 which connects to the program loader processor 20 through a cable 24. The display terminal 23 is a commercially available system such as that sold by TEC, Inc. under the trademark "Mini-Tec Data-Screen" and in addition to the keyboard 22, it includes a CRT display 25 and a communications module 26 which provides an EIA RS-232C compatible interface with the cable 24. The keys on the keyboard 22 are marked with symbols typically used in program loaders as shown in FIG. 7. Controller program instructions entered through the keyboard 22 are coupled to the program loader processor 20 which converts them into the format disclosed in the above cited U.S. Pat. No. 3,942,158. After the conversion has been made, the program loader processor 20 interrupts the controller processor 9 for a one-microsecond memory cycle to load the program instruction into the control program portion 4 of the read/write memory 1. p The program loader processor 20 may also interrupt the controller processor 9 to perform other functions. These include loading data into the memory 1 or reading out control program instructions or sixteen-bit data words. Status words read out of the image table 2 or 3 are converted to a form suitable for operating the CRT display 25 and the operator is thus provided with a visual indication of the state of the controlled machine 16. A particularly useful monitoring feature on the program loader is disclosed in U.S. Pat. No. 4,070,702 which issued on Jan. 24, 1978 and is entitled "Contact Histogram For Programmable Controller."

The program loader processor 20 is located within the same enclosure as the programmable controller elements, whereas the display terminal 23 is outside the enclosure and may be located remotely if desired.

Figure 3:
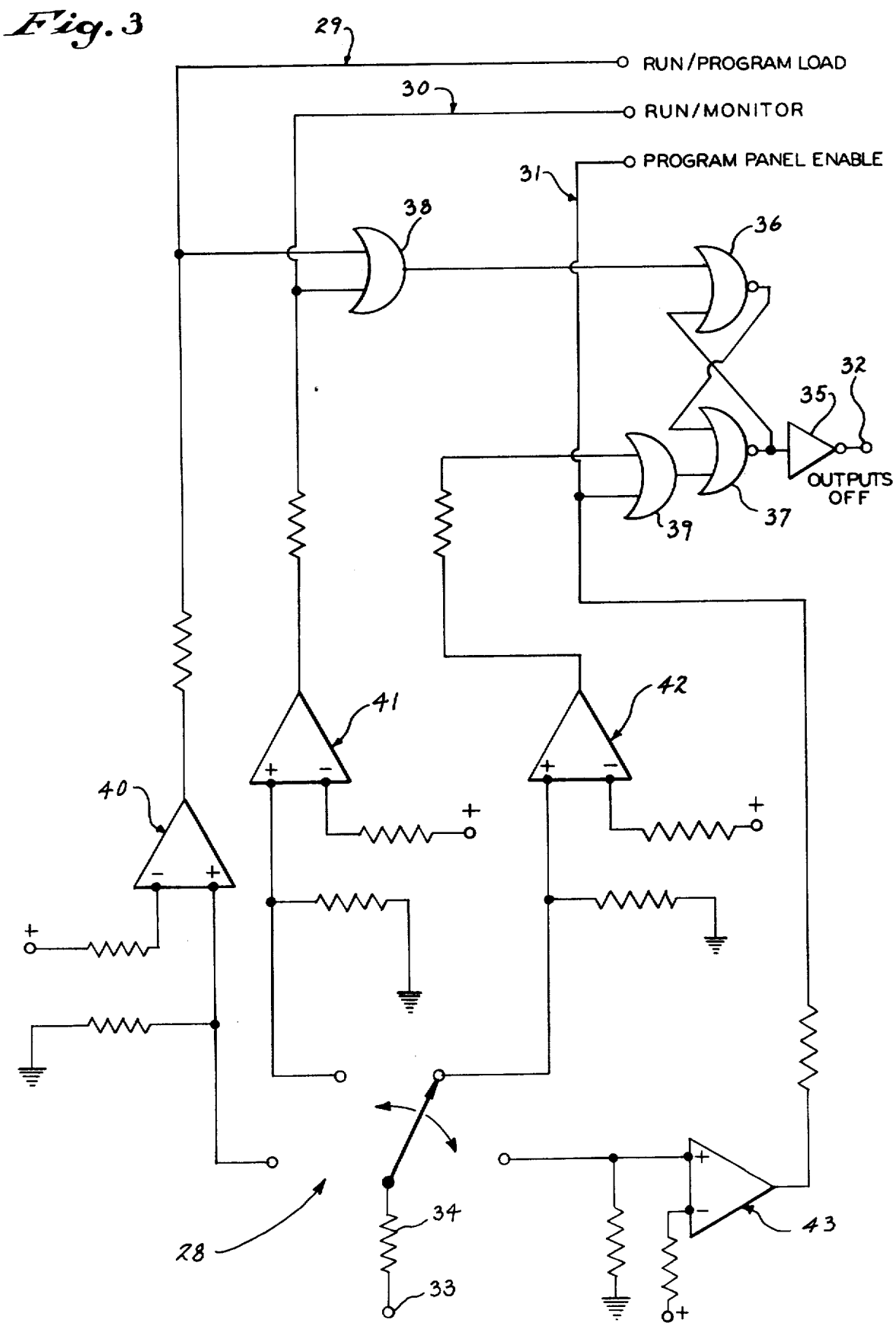
FIG. 3 is a schematic diagram of a portion of the processor front panel of FIG. 1.

Referring to FIGS. 1 and 3, the front of the enclosure which contains the programmable controller processor 9 includes a number of switches and indicators which are referred to collectively as the processor front panel 27. One of these switches is a single-pole, four position, mode selector switch 28 which is manually operable to drive four mode control lines. These control lines connect to both processors 9 and 20 and they include a RUN/PROGRAM LOAD line 29, a RUN/MONITOR line 30, a PROGRAM PANEL ENABLE line 31, and an OUTPUTS OFF line 32. The movable contact on the selector switch 28 connects to a logic high voltage source 33 through a resistor 34 and this is applied through respective analog comparator circuits 40, 41 and 43 to the lines 29, 30 or 31 when the switch is set to the respective RUN/PROGRAM LOAD, RUN/MONITOR or PROGRAM PANEL ENABLE positions. The OUTPUTS OFF line 32 is driven through an inverter gate 35 by a flip-flop which is formed by a pair of NOR gates 36 and 37. One input of the NOR gate 36 is connected to the RUN/MONITOR or RUN/PROGRAM LOAD positions of the selector switch 28 by an OR gate 38, and one input of NOR gate 37 is connected to the TEST/MONITOR or PROGRAM PANEL ENABLE positions by an OR gate 39. The comparator circuits 40-43 serve to hold the control lines 29-32 at a logic low voltage until driven high by the selector switch 28 or the program loader processor 20. Table I indicates the logic state of the mode control lines as a function of selector switch position.

TABLE I

| Switch Position | Mode Line 29 | Mode Line 30 | Mode Line 31 | Mode Line 32 |
|---|---|---|---|---|
| RUN/PROGRAM LOAD | HIGH | LOW | LOW | HIGH |
| RUN/MONITOR | LOW | HIGH | LOW | HIGH |
| TEST/MONITOR | LOW | LOW | LOW | LOW |
| PROGRAM PANEL ENABLE | LOW | LOW | HIGH | LOW |

When the RUN/MONITOR control line 30 is at a logic high voltage the controller processor 9 executes the control program 4 and operates the controlled machine 16. When the RUN/MONITOR control line 30 is at a logic low voltage, the processor 9 reads out the control program 4, but the read/write line 6 is held low so that data cannot be written into the memory 1 by the processor 9. The OUTPUTS OFF control line 32 couples to the I/O interface racks 18 and it serves to connect or disconnect all operating devices on the controlled machine 16 depending on its logic state. That is, when the OUTPUTS OFF control line 32 is low, the operating devices connected to I/O interface rack 18 are decoupled from the programmable controller and are not controlled thereby. Editing functions may thus be performed on the control program 4 without affecting the operation of the machine 16 until the mode selector switch is changed to the RUN/MONITOR mode. The PROGRAM PANEL ENABLE control line 31 enables the program loader to perform its usual programming and editing functions on the control program 4 stored in the memory 1. Since the RUN/MONITOR control line 30 is low when the PROGRAM PANEL ENABLE mode is selected, these programming and editing functions are performed "off-line."

One aspect of the present invention is that when the RUN/PROGRAM LOAD control line 29 is driven to a logic high voltage by placing the selector switch 28 in the RUN/PROGRAM LOAD mode, the logic state of the remaining control lines 30, 31 and 32 can be set through the program loader keyboard 22. This in essence enables the operator of the program loader to control the mode of operation of the programmable controller without operating the selector switch 28. If the selector switch is locked in the RUN/PROGRAM LOAD mode, mode selection can only be made at the program loader keyboard 22 which may be located in a remote and secure location.

Figure 2:
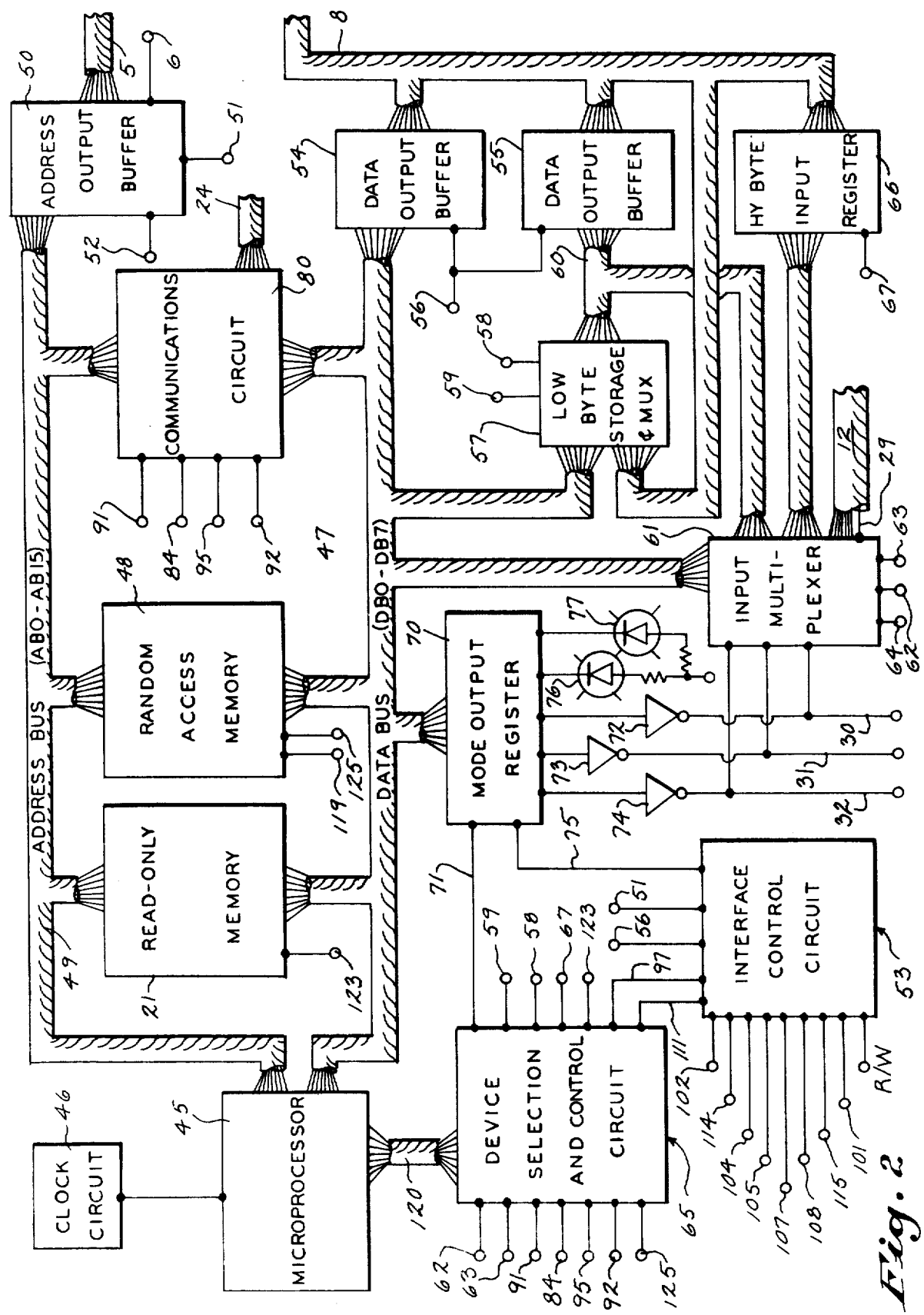
FIG. 2 is a block diagram of the program loader processor of FIG. 1.

Referring particularly to FIG. 2, the program loader processor 20 includes an eight-bit microprocessor 45 such as that sold commercially by Zilog as the Model Z80. The microprocessor 45 is driven by a 2.5 mHz clock circuit 46 and is connected through an eight-bit bidirectional data bus 47 to a number of elements. These elements include the 16 K read-only memory 21 which stores microprocessor machine instructions that are read out in sequence to direct the microprocessor through its functions and a 1 K random access memory 48 which stores data. The particular line from which data is read or into which data is written is determined by the microprocessor 45 through a sixteen-bit address bus 49. Address bus leads AB0–AB13 also connect to a fifteen-bit address output buffer 50. The address output buffer 50 is comprised of hex bus drivers with 3-state output terminals that are connected to the respective leads in the programmable controller address bus 5. The control inputs on these drivers are commonly connected to an ADD OUT control line 51. The output terminal of the fifteenth driver in the address output buffer 50 connects to the controller read/write line 6 and its input terminal is driven by a RD/WR control line 52. The control lines 51 and 52 are driven by an interface control circuit 53 to be described in detail hereinafter.

The microprocessor treats the programmable controller address bus 5 as an extension of its own address bus 49 and the controller memory 1 as an extension of its own memories 21 and 48. Table II indicates the addresses which are generated on the address bus 49 to enable the various processor elements including the separate lines of the memories 21 and 48 and the separate lines of the controller memory 1.

clocks the data into the low byte storage and muliplexer 57. The stored data is generated at its outputs and appears on an 8-bit bus 60.

To output a sixteen-bit word to the controller memory 1, the eight least significant bits, or in other words, the low byte, is first stored in the low byte storage and multiplexer 57. The appropriate line in the memory 1 is addressed through address output buffer 50, the high byte is generated on the data bus 47, and the data output buffers 54 and 55 are then enabled through the OUT EN control line 56. The generation of the proper memory address and the proper data is accomplished by the microprocessor 45 under the direction of machine instructions stored in the read-only memory 21. The timing and sequence of operation of the output buffers 54 and 55 is determined by the interface control circuit 53 which also operates to steal a one microsecond memory cycle from the controller processor 9. During the one

TABLE II

| ADDRESSED ELEMENT | ADDRESS (Decimal) | ADDRESS (Hexadecimal) |
|---|---|---|
| Read-Only Memory 21 | 0 to 16383 | H to 3FFF |
| Random Access Memory 48 | 64512 to 65535 | FC00 to FFFF |
| Controller Memory 1 | 16384 to 61439 | 4000 to EFFF |
| USART 81 | | Read data = 20 |
| | | Read status = 21 |
| | | Write data = 24 |
| | | Write command = 25 |
| USART 82 | | Read data = 40 |
| | | Read status = 41 |
| | | Write data = 44 |
| | | Write command = 45 |
| Counter Timer Circuit 83 | | Channel 0 = 58 |
| | | Channel 1 = 59 |
| | | Channel 2 = 6A |
| | | Channel 3 = 6B |
| Data Multiplexer 94 | | Serial status = 74 |
| | | 8 Bit control |
| | | Input Port = 75 |
| Input Multiplexer 61 | | Channel 1 = 72 |
| | | Channel 2 = 70 |
| | | Channel 3 = 73 |
| | | Channel 4 = 71 |
| Mode Output Register 70 | | 78 |
| Low Byte Storage & Multiplexer 57 | | 7C |

When the controller memory 1 is addressed, data is either written into it or read from it through its 16-bit data bus 8. This memory data bus 8 is coupled to the eight-bit data bus 47 of the program loader processor 20 by a pair of eight-bit data output buffers 54 and 55. The data buffers 54 and 55 are comprised of hex bus drivers with 3-state output terminals that are connected to the respective sixteen leads in the bus 8. Their control terminals are commonly connected to an OUT EN control line 56 which is driven by the interface control circuit 53. The eight inputs of the output buffer 54 connect to the respective leads DB0-DB7 in the data bus 47 and the eight inputs of the output buffer 55 connect to the outputs of a low byte storage and multiplexer 57. The storage and multiplexer 57 is a pair of quadruple 2-input multiplexers with storage having one set of eight inputs connected to the leads DB0-DB7 in the data bus 47 and the other set of eight inputs connected to the eight least significant leads in the controller memory data bus 8. A MUX SEL control line 58 determines through which of the two sets of multiplexer inputs data will be entered and stored and a signal on a MUX CL control line 59 microsecond memory cycle the sixteen-bit word is transferred to the memory 1 from the output buffers 54 and 55.

Data is inputted to the program loader data bus 47 through an input multiplexer 61. The input multiplexer 61 is a set of four dual 4-line-to-1-line data multiplexers with eight 3-state outputs which connect to the respective leads DB0-DB7 in the data bus 47. Four eight-bit input channels (1-4) are thus formed and the selection of channels is made through a SEL A control line 62 and SEL B control line 63. Data is inputted to the data bus 47 through a selected channel 1-4 when a logic high voltage appears at a MUX EN control line 64. The control lines 62-64 are all driven by a device selection and control circuit 65 to be described hereinafter.

The terminals of input channel 1 on input multiplexer 61 connect to leads in the control lines bus 12 and to the RUN/PROGRAM LOAD line 29. The terminals of input channel 2 connect to eight output terminals on a hi byte input register 66 and three of the eight terminals of input channel 3 connect to the respective mode control lines, RUN/MONITOR 30, PROGRAM PANEL ENABLE 31 and OUTPUTS OFF 32. The eight terminals of input channel 4 connect to the leads in bus 60 which are driven by the low byte storage and multiplexer 57. The hi byte register 66 is a pair of quadruple D-type flip-flops having their clock terminals commonly connected to a PLC IN control line 67. Their D inputs connected to the respective eight most significant leads in the memory data bus 8 and their outputs connect to channel 2 of multiplexer 61 as described above.

The operation of the input multiplexer 61, the hi byte input register 66 and the low byte multiplexer 57 are controlled by the device selection and control circuit 65 in response to machine instructions executed by the microprocessor 45. When a 16-bit word is to be inputted from the controller memory 1, for example, the MUX CL line 59 and PLC IN line 67 are driven high to store the hi byte in register 66 and the low byte in storage 57. As part of such a memory read machine instruction, channel 2 of the input multiplexer 61 is selected through the SEL A line 62 and SEL B line 63 and the hi 8-bit byte of the 16-bit memory word is coupled to the data bus 47. The following machine instruction executed by the microprocessor 45 selects channel 4 of the input multiplexer 61 and the low 8-bit byte of the memory data word is coupled to the data bus 47 from the storage 57.

The program loader processor 20 can either read the state of the mode control lines 29–32, or under proper conditions it can drive the mode control lines 30–32. The RUN/PROGRAM LOAD line 29 is connected to input channel 1 of the input multiplexer 61 along with other control lines in the bus 12, whereas the RUN/MONITOR control line 30, the PROGRAM PANEL ENABLE control line 31 and the OUTPUTS OFF control line 32 connect to input channel 3 of the multiplexer 61. By addressing the appropriate multiplexer input channel and executing a data input machine instruction, the logic state of the mode control lines 29–32 can be determined. The addresses of the multiplexer input channels 1–4 are indicated in Table II.

The logic state of the mode control lines 30–32 can be controlled by the program loader processor 20 through a mode output register 70. The mode output register 70 is a hex D-type flip-flop having a common clock terminal which connects through a WR STATUS control line 71 to the device selection and control circuit 65. Four inputs on the register 70 connect to the four least significant leads DB0–DB3 in the data bus 47 and three of the corresponding outputs connect through buffers 72, 73 and 74 to the respective mode control lines 30, 31 and 32. A fourth output terminal connects through a FREEZE control line 75 to the interface control circuit 53 and indicator lights 76 and 77 connect to the fifth and sixth register output terminals. The address of the mode output reigster 70 is indicated in Table II and by outputting the appropriate data to the register 70, the state of the mode control lines 30–32, the FREEZE line 75 and the indicators 76 and 77 can be controlled.

Referring to FIGS. 1, 2 and 6, the program loader processor 20 communicates with the display terminal 23 through a communications circuit 80. The communications circuit connects to the eight leads DB0–DB7 in the data bus 47 and it connects to leads AB0, AB1, AB5 and AB6 in the address bus 49. The communications circuit 80 includes a pair of universal asynchronous receiver/transmitters which are referred to hereinafter as USART 81 and USART 82 and a counter timer circuit 83. USART 81 and USART 82 are both connected to the data bus 47 and they receive and store an eight-bit data word when they are addressed through leads AB0, AB5 and AB6 and a USART WR control line 84 is driven high by the device selection and control circuit 65. This eight-bit data word is transmitted serially through respective line drivers 85 and 86 when clock pulses are received through respective inverter gates 87 and 88 from the counter timer circuit 83. Conversely, eight-bit data words may also be serially received at each USART 81 and 82 through respective line filters 89 and 90. The received data words are coupled to the data bus 47 when the USART 81 or 82 is addressed and a USART RD control line 91 is driven high by the device selection and control circuit 65.

The rate at which the USARTs 81 and 82 transmit serial data is controlled by the counter timer circuit 83 which in turn receives baud rate numbers from the data bus 47. The counter timer circuit 83 is addressed through leads AB0 and AB1 and is enabled by the device selection and control circuit 64 through a CTC CE control line 92. It stores a baud rate number for each of the USARTs 81 and 82 (channels 1 and 2) which can be changed by appropriate machine instructions stored in the read-only memory 21. The addresses of the various elements of the communications circuit 82 are indicated in Table II.

The cable 24 from the display terminal 23 connects to line driver 86 and line filter 90 of USART 82. An ASCII character generated by the keyboard 22 is received serially at the USART 82 and when all eight bits have been received, the USART 82 generates a "character present" status signal on the data bus 47 when its status is read. The received character is then inputted to the microprocessor 45 and its identity is determined. When transmitting ASCII characters to the CRT display 25, the reverse procedure occurs. The ASCII character is written into the USART 82 and serial transmission through the line drive 86 is begun. The status of the USART 82 is checked to determine that transmission is complete before writing another character into it. The USART 81 operates in the same manner and the cable 93 which it drives may, for example, be connected to another programmable controller or to a digital computer. The cable 24 may be up to 1000 feet in length thus enabling the display terminal 23 to be located remotely.

The communications circuit 80 also includes an eight-bit data multiplexer 94 which serves as an eight-bit parallel data input port. The data multiplexer 94 is addressed as indicated in Table II and is enabled through a RD CHAN PORT control line 95 by the device selection and control circuit 65.

Figure 4:
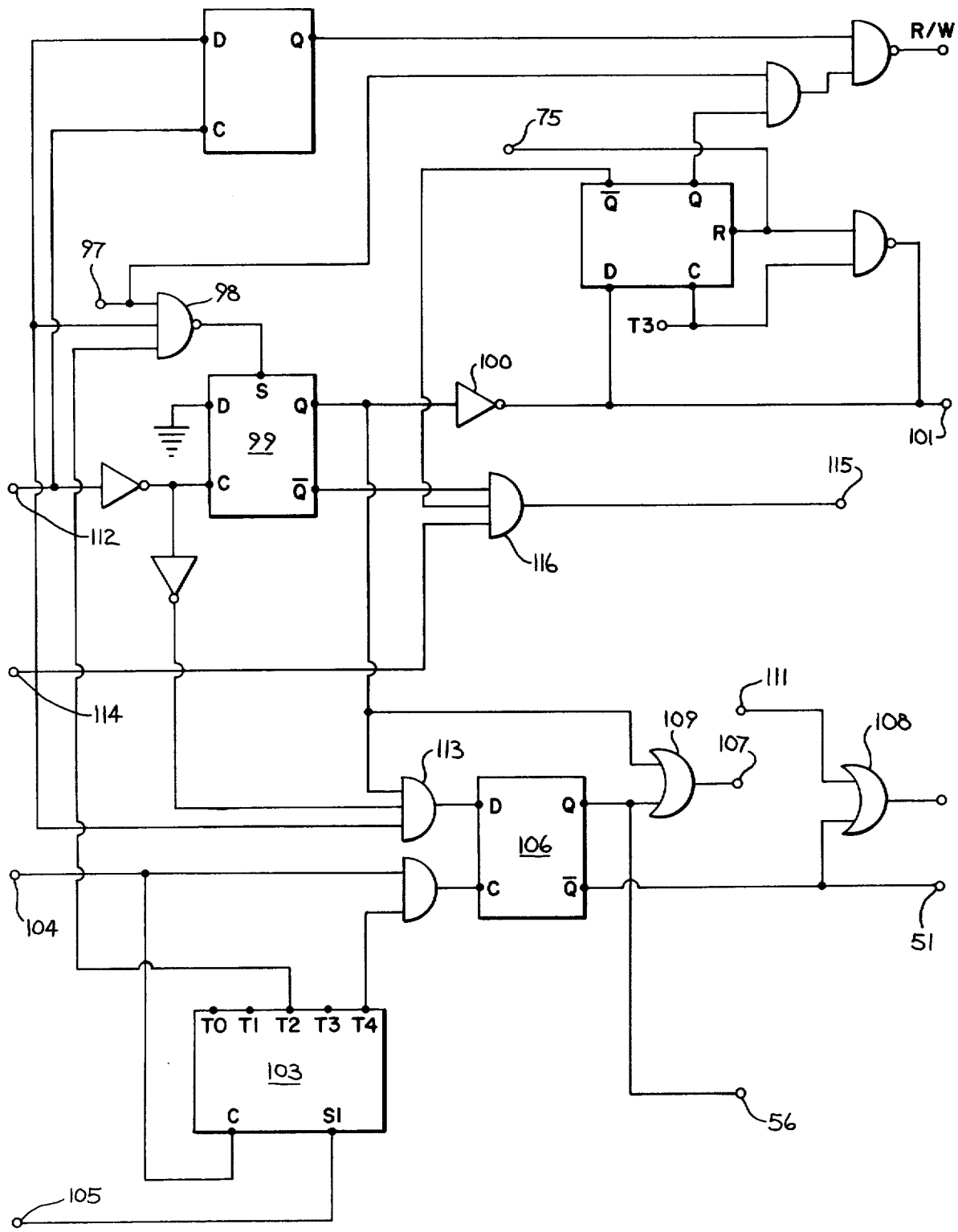
FIG. 4 is a schematic diagram of the interface control circuit which forms part of the program loader processor of FIG. 2.

Referring particularly to FIGS. 1, 2 and 4, the interface control circuit 53 operates in response to a signal from the device selection and control circuit 65 to request a one microsecond memory cycle from the controller processor 9. When this memory cycle is granted, the control circuit 53 then operates to control the writing of a data word into the controller memory 1 or the reading of a data word from the controller memory 1. The signal which starts the sequence is received through an ENPORT control line 97 which couples through a NAND gate 98 to the preset terminal on a flip-flop 99. As a result, a Q output on the flip-flop 99 is set to a logic high voltage and this is inverted by a gate 100 and applied to an interrupt request control line 101 which connects to the controller processor 9. In addition, the Q output of flip-flop 99 also drives a WAIT control line 107 through an OR gate 109. The WAIT control line 107 connects to the microprocessor 45 and it stops the execution of further machine instructions. As indicated in the above cited U.S. Pat. No. 3,942,158 the controller processor responds shortly with a logic high voltage on a GRANT line 102 and within the one microsecond which follows, the memory data bus 8 and address bus 5 is relinquished to the program loader processor 20. When this occurs, the microprocessor 45 is enabled again through the WAIT control line 107 to execute machine instructions.

The control circuit 53 is synchronized with the control processor 9 by a five-bit shift register 103 which has its clock terminal connected to receive a five megahertz signal generated by the controller polyphase clock 10 through a line 104 and its input connected to receive a T4 timing signal from the controller processor 9 through a line 105. A logic high is shifted through the register once every microsecond in synchronism with a similar register in the controller processor 9 to divide the memory cycle into five two hundred nanosecond time periods, T0-T4.

The GRANT line 102 goes high during the T3 time period and remains high for approximately one-half microsecond. During the T4 time period which follows a flip-flop 106 is set and remains set for one microsecond. The Q output of the flip-flop 106 goes high to enable the data output buffers throughthe OUT EN control line 56 and its $\overline{Q}$ output goes low to enable address output buffers 50 through the ADD OUT control line 51. The Q output also drives the WAIT control line 107 through the OR gate 109 to stop the execution of further machine instructions during the remaining one microsecond time period. An OR gate 108 is also enabled by the flip-flop 106 and its output connects to the RD/WR control line 52 which drives the R/W control line 6 through the address output buffer 50. A second input on the OR gate 108 is driven by a RD EN control line 111 which connects to the device selection and control circuit 65. If a data word is to be read from the controller memory 1 during the one micro-second time period, the RD/WR control line 52 is driven high and is coupled to the R/W control line 6. Otherwise, it is driven low and a memory write function is performed.

The signal on the GRANT control line 102 which sets the flip-flop 106 also resets the flip-flop 99. Its Q output is thus driven low to terminate the signal on the interrupt request line 101 and to disable an AND gate 113 which drives the D input of flip-flop 106. As a result, when the next T4 time period is generated by the shift register 103, the flip-flop 106 is reset to terminate access to the controller memory 1.

The interface control circuit 53 also connects to a grant enable input control line 114 and a grant enable output control line 115. These lines form a daisy chain with the I/O scanner 11 and controller processor 9 and they are coupled together by an AND gate 116. One input of the AND gate 116 is connected to the $\overline{Q}$ output of flip-flop 99 and the daisy chain is thus broken by the AND gate 116 when the program loader processor 20 receives its one microsecond access to the controller memory 1. A similar gate is present in the I/O scanner 11 and in this manner it is certain that only one interrupt request is granted at a time.

As indicated by the above description, the operation of the program loader processor elements are controlled by the device selection and control circuit 65 which in turn is controlled by machine instructions stored in the read-only memory 21. Each machine instruction which calls for the transfer of data to or from one of the processor elements includes an operand (either actual or implied) and an operation code. The device selection and control circuit 65 operates in response to the operand which is generated on leads of the address bus 49 and the operation code which enables certain processor control lines to enable the proper processor elements. These address lines and control lines which drive the device selection and control circuit 65 are indicated in FIG. 2 by the bus 120.

Figure 5:
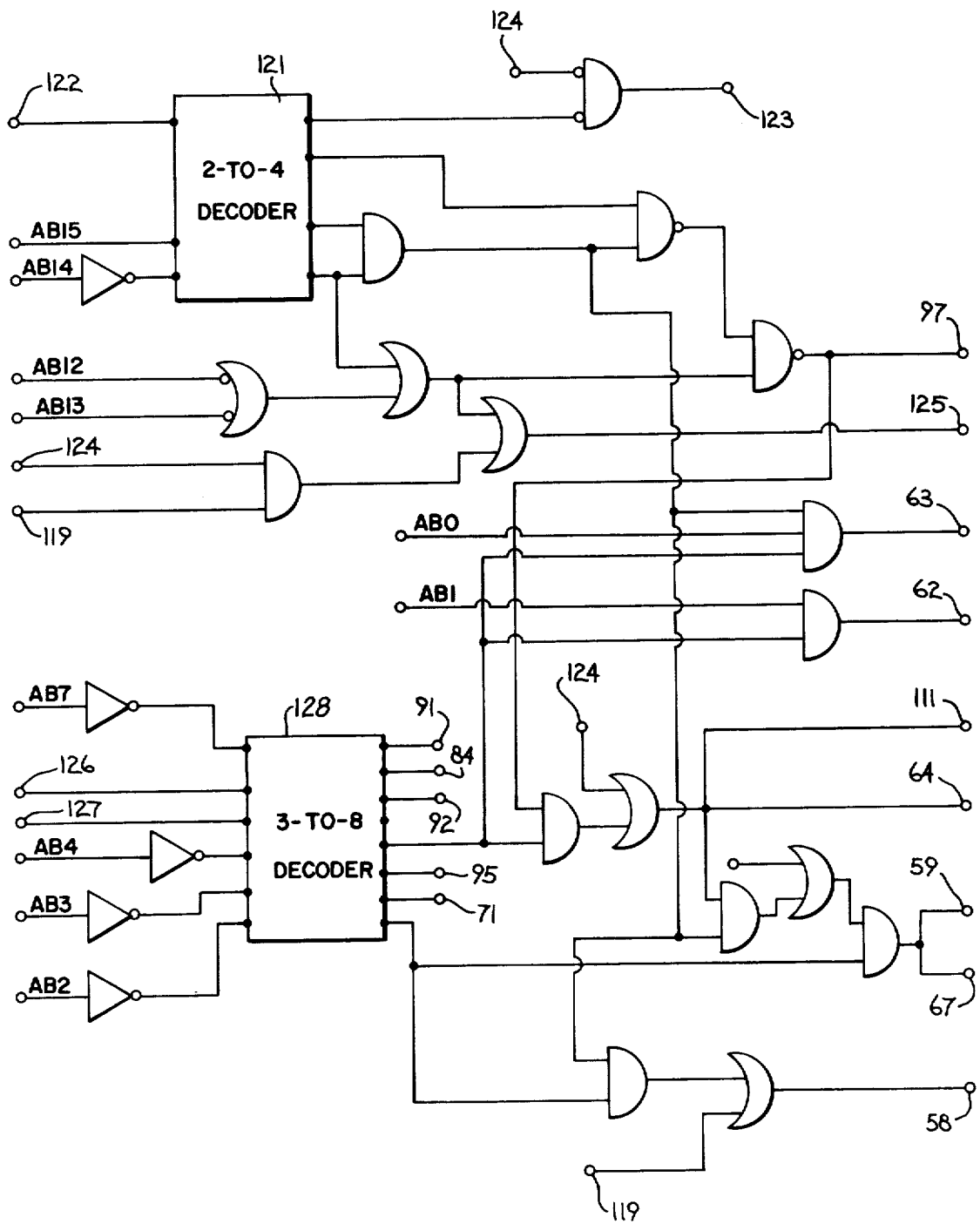
FIG. 5 is a schematic diagram of the device selection and control circuit which forms part of the program loader processor of FIG. 2.

Referring particularly to FIGS. 2 and 5, the device selection and control circuit 65 includes a 2-to-4-line decoder 121 which operates in combination with a set of logic gates to enable the read-only memory 21 or the random access memory 48 when they are addressed. The decoder 121 is enabled by a signal from the microprocessor 45 through an MREQ control line 122 which indicates that data is to be transferred to or from memory. The addresses of the memories 21 and 48 as well as the controller memory 1 are indicated in Table II. When the read-only memory 21 is addressed, a CS control line 123 is driven high by the decoder 121 as well as a RD control line 124 which eminates directly from the microprocessor 45. When the random access memory 48 is addressed, an enabling signal is generated on an END control line 125 and a read or a write operation is performed depending on the state of a WR control line 119 which eminates directly from the microprocessor 45. And finally, when the controller memory 1 is addressed, the decoder 121 and associated gates generate an enabling signal on the ENPORT control line 97 to the interface control circuit 53. As indicated above, this initiates an interrupt request and subsequent data transfer.

The least significant leads in the address bus 49 and microprocessor control lines IORQ 126 and M1 127 are decoded to enable the remaining elements of the processor 20. The decoding is accomplished with a 3-to-8-line decoder 128 and associated logic gates. The control lines which are active in enabling the various processor elements are indicated in Table III.

TABLE III

| ACTIVE CONTROL LINE | PROCESSOR ELEMENT ENABLED |
|---|---|
| WR STATUS 71 | OUTPUT DATA TO MODE OUTPUT REGISTER 70 |
| CTC CE 92 | OUTPUT DATA TO COUNTER TIMER 83 |
| CTC CE 92; RD 124 | INPUT DATA FROM COUNTER TIMER 83 |
| RD CHAN PORT 95 | INPUT DATA FROM DATA MULTIPLEXER 94 |
| USART RD 91 | INPUT DATA FROM USART 81 OR 82 |
| USART WR 84 | OUTPUT DATA TO USART 81 OR 82 |
| | INPUT DATA FROM CONTROLLER MEMORY 1 |
| ENPORT 97; RD EN 111 | (A) INTERFACE CONTROL CIRCUIT 53 |
| PLC IN 67 | (B) HI BYTE INPUT REGISTER 66 |
| MUX CL 59; MUX SEL 58 | (C) LOW BYTE STORAGE & MUX 57 |
| MUX EN 64; SEL A 62; SEL B 63 | (D) INPUT MULTIPLEXER 61 |
| | OUTPUT DATA TO CONTROLLER MEMORY 1 |

TABLE III-continued

| ACTIVE CONTROL LINE | PROCESSOR ELEMENT ENABLED |
|---|---|
| MUX CL 59; MUX SEL 58 | (A) LOW BYTE STORAGE & MUX 57 |
| ENPORT 97 | (B) INTERFACE CONTROL CIRCUIT 53 |
| OUT EN 56 | (C) DATA OUTPUT BUFFERS 54 AND 55 |

The ability of the program loader 20 to output data to the controller memory 1 and display terminal 23 as well as its ability to drive the mode control lines 30-32 is controlled by microprocessor machine instructions which direct the microprocessor to issue commands that are decoded by the device selection and control circuit 65. Similarly, data is inputted from the controller memory 1, display terminal 23 or mode control lines 29-32 in response to microprocessor machine instructions stored in the read-only memory 21. For a complete description of the instruction set for the microprocessor 45 as well as a detailed description of the structure and operation of this microprocessor, reference is made to Z80-CPU Technical Manual published in 1976 by Zilog.

The program stored in the read-only memory 21 is operable generally to input characters from the keyboard 22, decoded them to form operator commands, and then to carry out the command. With reference to FIG. 7, the following is a list of some of the commands which are possible.

| | FUNCTION COMMANDS |
|---|---|
| TTY | Transfer control of the program loader from the keyboard 22 to a TTY. |
| DISPLAY | Transfer control from TTY to the keyboard 22 or erase the screen and update rung diagram on CRT display 25. The CRT display 25 is automatically updated to display in rung diagram format a portion of the control program stored in the controller memory 1. |
| CLEAR MEMORY 99 | Erase control program 4 from indicated point to end. |
| CANCEL COMMAND | Cancel previous command. |
| | EDIT COMMANDS |
| SEARCH | Locate indicated control instruction in the control program 4 and display its rung on CRT display 25. |
| SEARCH 8 | Locate all control instructions in the control program 4 with the same indicated I/O address and display its rung on CRT display 25. |
| SEARCH 9 | List errors and their memory addresses during cassette recorder verify operation. |
| SEARCH 6 SEARCH 7 | Contact histogram enabled to monitor status changes of a selected I/O device or timer/counter. |
| INSERT | Insert control instruction into the control program 4 between existing control instructions. |
| REMOVE | Delete indicated control instruction from the control program 4. |
| RUNG | Modifies insert and remove commands to insert or remove control instructions representing an entire ladder diagram rung. |
| ← → | Move CRT cursor left or right one element in rung on display 25; display previous rung; display next rung. Each element displayed on the CRT 25 corresponds to a control program instruction in the memory 1 and it is through these cursor commands along with the SEARCH command that the operator pages through the control program 4. |
| RUNG ↑ RUNG ↓ | |

The remaining keys on the keyboard 22 are employed to form control instructions such as those listed in U.S. Pat. No. 3,942,158. The numeric keys may also be employed to alter the data in the timers and counters portion of the controller memory 1. The control instruction will be loaded into the control program 4 at the point indicated by the CRT cursor.

Figure 8A:
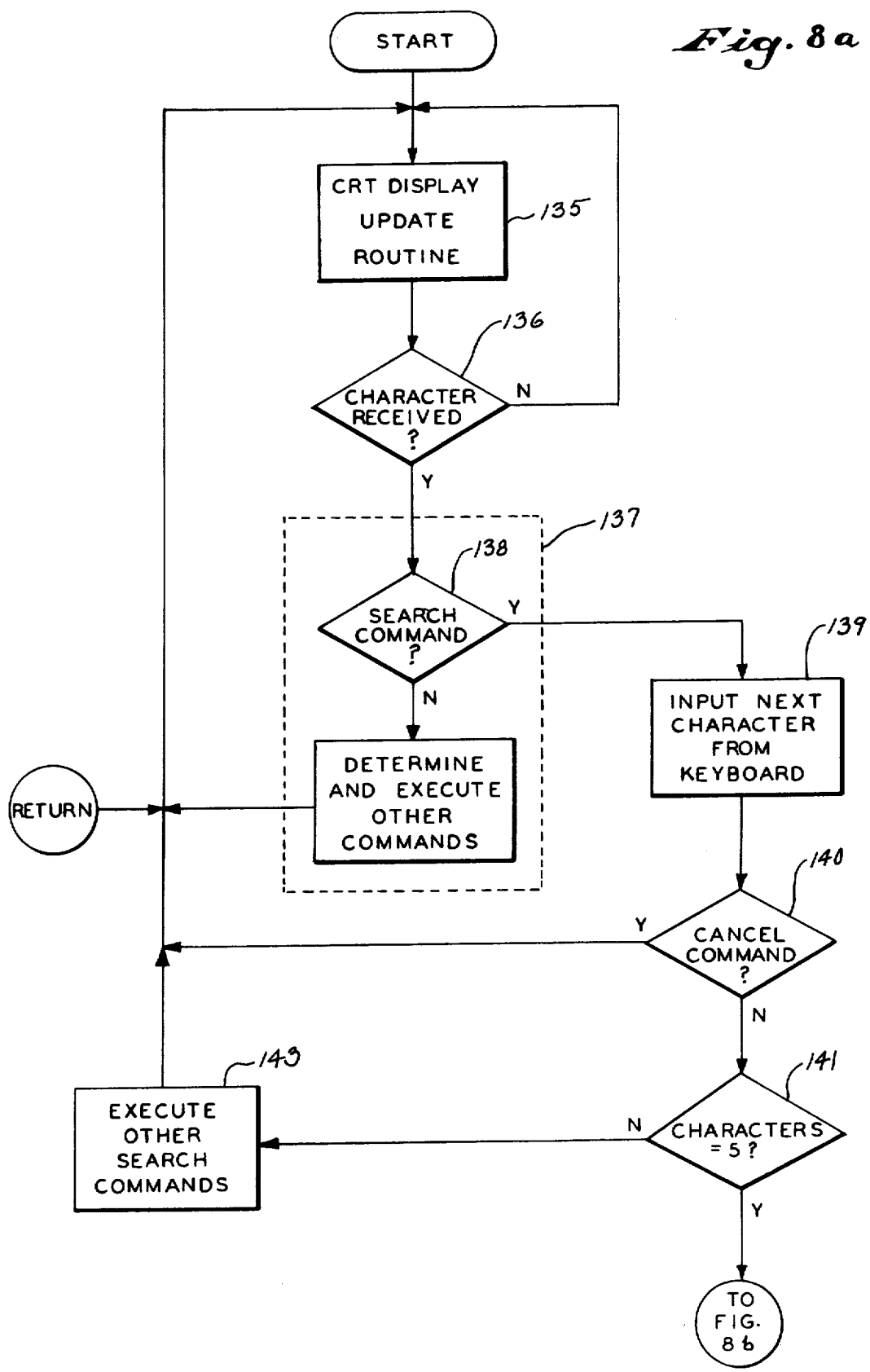
FIGS. 8a-c is a flow chart of the keyboard and display executive routine which forms part of the processor of FIG. 2.
Figure 8B:
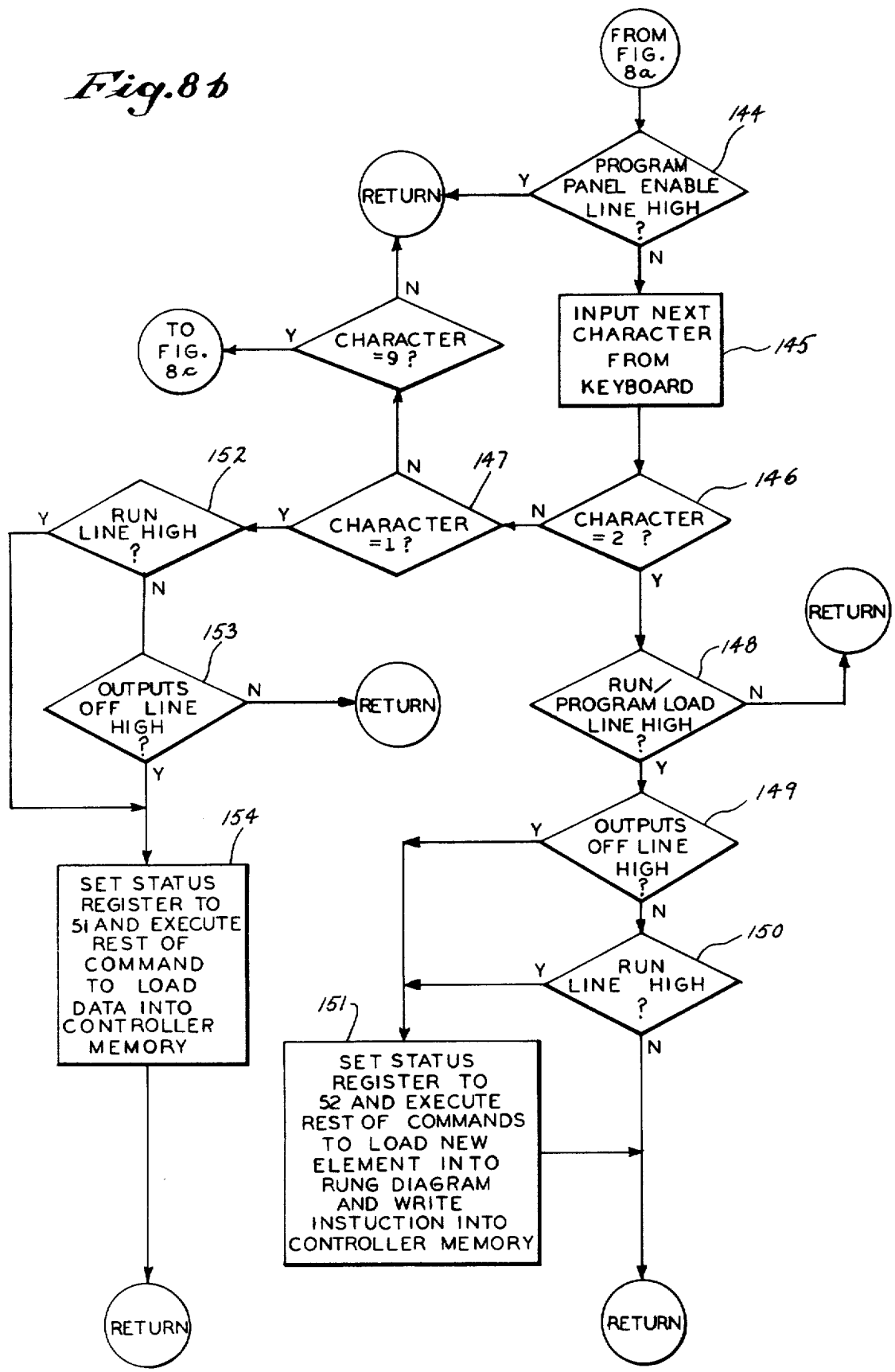
Figure 8C:
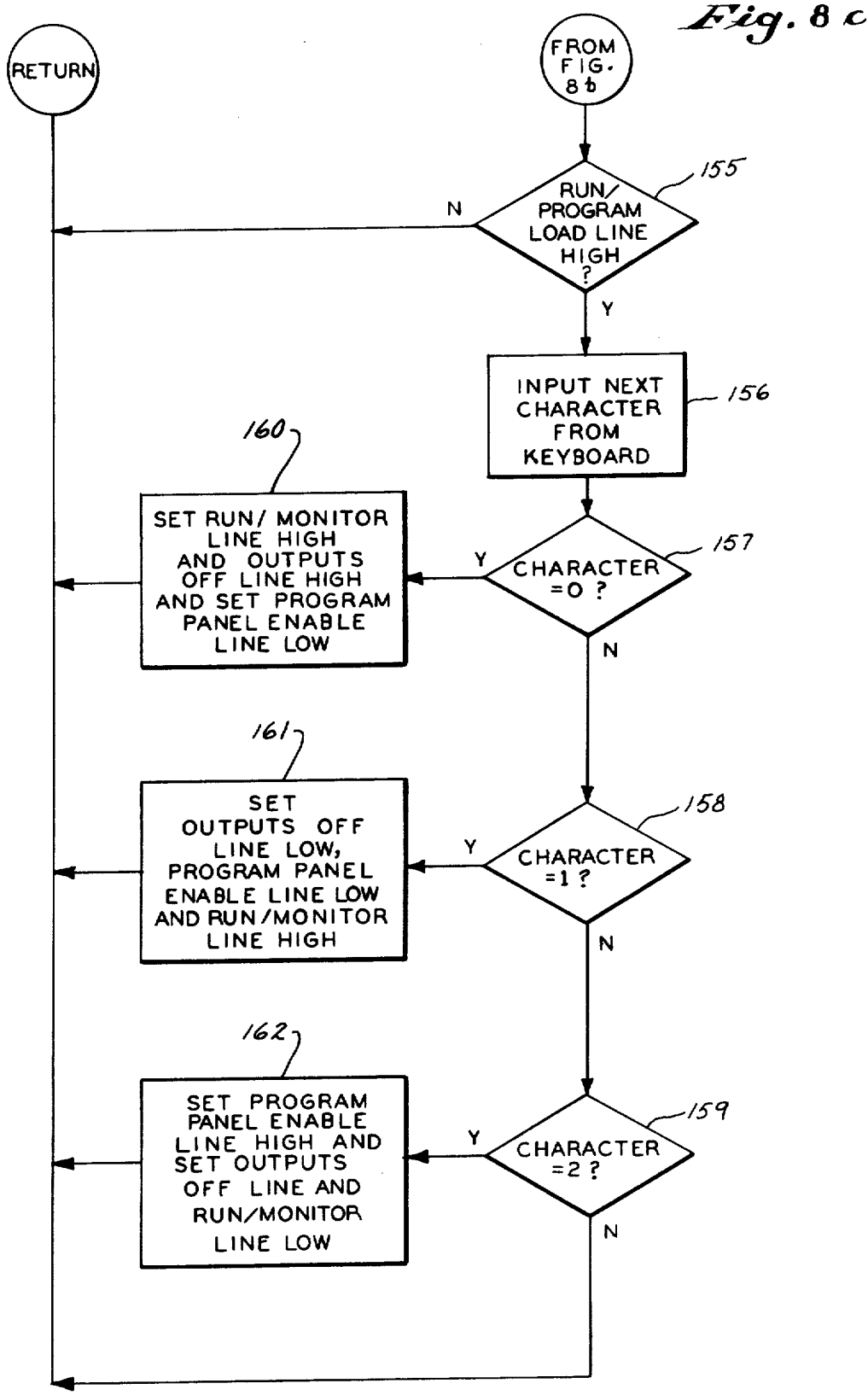

Referring to FIGS. 8a-c, when the DISPLAY function command is entered, a keyboard and display executive program stored in the read-only memory 21 is executed by the microprocessor 45. The mode control apparatus of the present invention is operated in part by machine instructions in this program which serve to establish the mode of operation of the programmable controller and which enable the mode to be changed through the keyboard 22.

The keyboard and display executive program is formed about a CRT display update routine 135 which is executed after the start-up functions are completed. As is well known in the art, the control program stored in the memory 1 can be schematically represented by a ladder diagram, with each rung of the diagram representing a set of controller instructions related in a particular operating device on the controlled machine 16. The CRT display update routine 135 reads a set of control program instructions out of the memory 1, converts them to a series of equivalent ASCII characters, and outputs those characters to the CRT display 25 to "paint" a picture of the equivalent ladder diagram rung. The operator controls which rung is displayed through the keyboard 22. As various changes are made in the control program by means of the editing commands, the corresponding rung displayed on the CRT 25 is changed to provide the operator with visual feedback of his actions.

Referring particularly to FIG. 8a, the system remains in a loop formed by the CRT display update routine 135 and a decision block 136 until a character is received from the keyboard 22. When a character is received it is analyzed to determine which command has been entered. This is accomplished by a series of instructions represented collectively by the dashed line 137. Such commands may include the function commands of TTY, DISPLAY, CLEAR MEMORY, CANCEL COMMAND, or the EDIT commands of INSERT or REMOVE listed above. In such case the system jumps to the proper routine for carrying out the indicated command. When the command has been executed, the system loops back to the CRT display update routine 135 and awaits the next keyboard command.

When a SEARCH command is received, the system branches at decision block 138 and awaits the receipt of the next character from the keyboard 22 as indicated by process block 139. If the received character is a CANCEL COMMAND the system branches back to the CRT display update routine 135 as indicated by decision block 140. Otherwise, the character is analyzed by decision blocks 141 and 142 to determine if it is a SEARCH 59 or SEARCH 5 command. If it is not, a SEARCH 6, SEARCH 7, SEARCH 8, SEARCH 9 or a SEARCH command has been requested, and the system jumps to the appropriate routine for execution, as indicated collectively by process block 143.

A SEARCH 51 command is a request to make an "on-line" change of data stored in the controller memory 1 and a SEARCH 52 command is a request to make an "on-line" change of the control program. Before these types of commands can be executed, however, the mode of operation must be checked. Referring to FIG. 8b, to accomplish this the status of the mode control lines 30-32 is first inputted to the processor 45 and the state of the PROGRAM PANEL ENABLE line 31 is checked to determine if it is high. If it is, as indicated by decision block 144, on-line editing cannot be performed and the system branches back to the CRT display and update routine 135. Otherwise, the next character is inputted from the keyboard 22 as indicated by process block 145, and it is evaluated to determine whether it is a "2" or a "1," as indicated by decision blocks 146 and 147.

If the command is a SEARCH 52 the status of the RUN/PROGRAM LOAD line 29 is inputted to the processor 45. If it is not high, as indicated by decision block 148, on-line editing cannot be performed and the system branches back to the CRT display and update routine 135. Otherwise, the status of the OUTPUTS OFF line 32 and RUN/MONITOR line 30 are determined by decision blocks 149 and 150. If either control line 32 or 30 is high, the SEARCH 52 command can be executed and new controller instructions can be formed and loaded into the controller memory 1 as indicated by process block 151. A mode status register in the random access memory 48 is also set to indicate that on-line editing of the control program can be performed so that numerous changes in the control program 4 can be made without reentering the SEARCH 52 command each time.

If the command is a SEARCH 51, the status of RUN/MONITOR line 30 and OUTPUTS OFF line 32 are determined, as indicated by decision blocks 152 and 153. If either is high, the SEARCH 51 commands can be executed as indicated by process block 154. Access to the "timers and counters" portion of the controller memory 1 is thus possible in order to change the data therein. The status register in random access memory 48 is also set so that separate SEARCH 51 commands need not be entered for each change to the timers and counters data.

Referring to FIGS. 8a and 8c, the SEARCH 590, SEARCH 591 and SEARCH 592 commands are mode change commands which set the state of mode control lines 30-32. Before such a mode change can be made through the keyboard 22, however, the state of the RUN/PROGRAM LOAD line 29 is inputted and evaluated as indicated by decision block 155. If it is not high, no mode changes can be made from the program loader and the system branches back to the CRT display and update routine 135. Otherwise, the next character (i.e., 0, 1 or 2) is inputted from the keyboard 22 as indicated by the process block 156 and it is evaluated as indicated by decision blocks 157-159. If it is a "0," a SEARCH 590 command is indicated and a mode status word is outputted to the mode output register 70 to drive the RUN/MONITOR line 30 and the OUTPUTS OFF line 32 high and the PROGRAM PANEL ENABLE line 31 low. The RUN/MONITOR mode is thus established as indicated by process block 160. If a SEARCH 591 command is entered, the OUTPUTS OFF line 32 and PROGRAM PANEL ENABLE line 31 are driven low and the RUN/MONITOR line 30 is driven high by the mode status word, as indicated by the process block 161. The TEST/MONITOR mode of operation is thus established. Similarly, as indicated by process block 162, if the SEARCH 592 command is entered the PROGRAM PANEL ENABLE line 31 is driven high and the OUTPUTS OFF line 32 and the RUN/MONITOR line 30 are driven low to establish the PROGRAM LOAD mode of operation.

A listing of the keyboard and display executive program illustrated in the flow chart of FIGS. 8a-c appears in Appendix A.

It should be apparent from the above description that a mode selector switch is provided at the controller processor site which enables the user to select one of four possible modes of operation. Three of these modes of operation (RUN/MONITOR, TEST/MONITOR and PROGRAM PANEL ENABLE) directly determine the mode of operation of the programmable controller and they each determine what functions can be performed with the program loader through the keyboard 22. The fourth position (RUN/PROGRAM LOAD) sets the mode of operation to RUN/MONITOR as the position is entered and it also enables the user to select the desired mode of operation through the program loader keyboard 22. This fourth selector switch position in essence transfers mode control from the selector switch at the controller processor site to the keyboard 22 at the program loader site.

APPENDIX A
SEARCH COMMAND PROGRAM

| Label | Instruction | | Comment |
|---|---|---|---|
| | CALL | RCVD | Call subroutine for inputting data from keyboard 22 |
| | CP | 33Q | Is it a cancel command? |
| | JP | Z,DISPL | If so, jump to display routine 135. |
| | CP | 65Q | Is character a "5"? |
| | JR | Z,SRC5-S | If so, jump to processor for SEARCH 5 commands. |
| | . | . | |
| | . | . | |
| | . | . | |
| | . | . | |
| | Determine and execute other SEARCH commands. | | |
| | . | . | |
| | . | . | |
| | . | . | |
| SRC 5 | IN | A, (PLCS1) | Input channel 3 of input multiplexer 61 and load in microprocessor A register. |
| | BIT | 7,A | Check state of PROGRAM PANEL ENABLE line 31. |
| | JP | Z,DISPL | If it is high, jump to display routine 135. |
| | CALL | CNCEL | Otherwise, wait for next character from keyboard 22. |
| | CP | 61Q | Is the character at "1"? |
| | JR | Z,SRC5A-S | If so, jump to process SEARCH 51 command. |
| | CP | 62Q | Is the character a "2"? |
| | JP | NZ,SRC5B | If not, jump to SRC5B. |
| | IN | A,(PLCS2) | Input channel 1 of input multiplexer 61 and load in microprocessor A register. |
| | BIT | 4,A | Is RUN/PROGRAM LOAD line high? |
| | JP | NZ,DISPL | I not, jump to display routine 135. |
| | CALL | RTCK | Call subroutine to check state of OUTPUTS OFF and RUN/MONITOR control lines. |
| | LD | HL,FLAG | Load mode status register into H and L registers. |
| | LD | (HL),12Q | Set mode status register to SEARCH 52 mode. |
| | CALL | CNCEL | Wait for keyboard entry and check for cancel command. |
| | JP | LDRG1 | Jump to on-line program load and edit routine |
| SRC5B | CP | 69Q | Is character a "9"? |
| | JP | NZ,DISPL | If not, jump to display routine 135. |
| | JP | SRC 59 | Otherwise, jump to SRC59. |
| SRC5A | LD | HL,FLAG | Load mode status register into H and L registers. |
| | LD | (HL),11Q | Set mode status register to SEARCH 51 mode. |
| | CALL | RTCK | Call subroutine to check state of OUTPUTS OFF and RUN control lines. |
| | LD | HL,NUMIN | Load numeric flag into H and L registers and set to indicate numeric data can be entered. |
| | LD | (HL),61Q | |
| | CALL | CNCEL | Wait for keyboard entry and check for cancel command. |
| | LD | D,A | Store data from keyboard. |
| | JP | NUMIC | Jump to on-line numeric data entry routine. |
| RTCK | IN | A.(PLCS1) | Input channel 3 of input multiplexer 61 and load in microprocessor A register. |
| | BIT | 4,A | Check state of RUN/MONITOR control line. |
| | RET | Z | If RUN/MONITOR line is high return to callilng routine. |
| | BIT | 6,A | Check state of OUTPUTS OFF control line. |
| | RET | Z | If OUTPUTS OFF is high return to calling routine. |

APPENDIX A
SEARCH COMMAND PROGRAM

| Label | Instruction | | Comment |
|---|---|---|---|
| | JP | DISPL | Otherwise, return to CRT display update routine. |
| SRC59 | IN | A,(PLCS2) | Input channel 3 of input multiplexer 61 and load in microprocessor A register. |
| | BIT | 4,A | Check state of RUN/PROGRAM LOAD control line. |
| | JP | NZ,DISPL | If it is low, return to CRT display update routine. |
| | CALL | CNCEL | Wait for keyboard entry and |
| | CP | 60Q | Compare keyboard entry to determine if it is a zero. |
| | JR | Z,SRC4A-$ | If it is a zero jump to SRC4A. |
| | CP | 61Q | Compare keyboard entry to determine if it is a one. |
| | JR | Z,SRC4B-$ | If it is a one jump to SRC4B. |
| | CP | 62Q | Compare keyboard entry to determine if it is a two. |
| | JP | NZ,DISPL | If it is not a two, jump to the CRT display update routine. |
| | LD | A,(STATR) | Load status control register into microprocessor A register. |
| | AND | 337Q | Set PROGRAM PANEL ENABLE bit high. |
| | LD | (STATR),A | Load updated status control register back into memory 48. |
| | OUT | (STAT),A | Output status control register in A register to mode output register 70. |
| | JP | DISPL | Jump to CRT display update routine. |
| SRC59A | LD | A,(STATR) | Load status control register into microprocessor A register. |
| | AND | 357Q | Set RUN bit high. |
| | LD | (STATR),A | Load updated status control register back into memory 48. |
| | OUT | (STAT),A | Output status control register in A register to mode output register 70. |
| | JP | DISPL | Jump to CRT display update routine. |
| SRC59B | LD | A,(STATR) | Load status control register into microprocessor A register. |
| | AND | 375Q | Set OUTPUTS OFF line bit high. |
| | LD | (STATR),A | Load updated status control register back into memory 48. |
| | OUT | (STAT),A | Output status control register in A register to mode output register 70. |
| | JP | DISPL | Jump to CRT display update routine. |
| CNCEL | CALL | RCVD | Wait for character from keyboard 22. |
| | CP | 33Q | Check for cancel command. |
| | RET | Z | If not a cancel command return to calling routine. |
| | JP | DISPL | If a cancel command, jump to CRT display update routine. |

We claim:

1. In a programmable controller having a memory which stores a control program comprised of a set of controller instructions, having a controller processor which is operable to sequentially read controller instructions out of said memory and execute them, and having an I/O interface rack which couples to said controller processor and which interfaces it with sensing devices and operating devices on a controlled machine, the improvement therein comprising:

a mode switch associated with the controller processor which has a plurality of manually selectable positions and associated output terminals, said mode switch being operable to generate a logic signal at the output terminal associated with the selected position, said logic signal determines in which of a plurality of possible modes of operation the programmable controller is to operate;

a set of mode control lines, each connected to respective ones of said mode switch output terminals and coupled to said controller processor to effect its mode of operation; and a program loader connected to said mode control lines and coupled to said controller memory to read controller instructions out of said memory and to write controller instructions into said memory, said program loader including:

manual data entry means for entering commands into the program loader from a location remote from said controller processor, means for determining the presence of a logic signal on each of said control lines, and means responsive to the presence of a logic signal on a selected one of said control lines and selected commands entered through said data entry means for generating a logic signal on another one of said mode control lines and to thereby select in which of said plurality of possible modes of operation the programmable controller is to operate.

2. The programmable controller as recited in claim 1 in which each of said selected commands is associated with respective ones of said other mode control lines and said last named means is responsive to each of said selected commands to generate said logic signal on its associated mode control line.

3. The programmable controller as recited in claim 1 in which said program loader includes a microprocessor coupled to said manual data entry means, said means for determining the presence of a logic signal on said control lines includes an input multiplexer coupled to said microprocessor, and said last named means includes an output register coupled to said microprocessor.

4. The programmable controller as recited in claim 3 in which said manual data entry means includes a keyboard which is coupled to said microprocessor.

5. The programmable controller as recited in claim 4 in which said keyboard is coupled to said microprocessor through a serial data link.

6. The programmable controller as recited in claim 1 in which one of said mode control lines is coupled to said I/O interface rack and the logic signal generated thereon operates said I/O interface rack to decouple operating devices on the controlled machine from the programmable controller.

7. In a programmable controller having a memory which stores a control program and a controller processor for reading out the control program instructions and executing them to control operating devices on a controlled machine, the combination comprising:

mode selector means coupled to said controller processor through a set of mode control lines and being manually operable to generate mode control signals that determine in which of a plurality of possible modes of operation the programmable controller is to operate;

manual data entry means located remotely from said controller processor; and a program loader processor coupled to said manual data entry means, said mode selector means and said controller memory, said program loader processor including:

(a) first means responsive to said mode control signals indicating that a first one of said plurality of possible modes has been selected to enable data entered through said manual data entry means to control the editing of the control program stored in said controller memory; and (b) second means responsive to the mode control signals indicating that a second one of said plurality of possible modes has been selected to enable commands entered through said manual data entry means for generating a logic signal on another one of said mode control lines and to thereby select in which of said plurality of possible modes of operation the programmable controller is to operate.

8. The programmable controller as recited in claim 7 in which said mode selector means is a selector switch which is connected to said program loader processor through a set of control lines, and said program loader processor includes an input multiplexer connected to said set of control lines for coupling the mode control signals thereon to said first and second means.

9. The programmable controller as recited in claim 8 in which said second means is coupled to said set of control lines by an output register and said second means generates mode control signals on said set of control lines through said output register.

10. The programmable controller as recited in claim 7 in which said manual data entry means includes a keyboard which is coupled to said program loader processor by a serial data link.

11. In a programmable controller having a memory which stores a control program and a controller processor for reading out the control program instructions and executing them to control operating devices on a controlled machine, the combination comprising:

mode selector means coupled to said controller processor through a set of mode control lines and being manually operable to generate mode control signals that determine in which of a plurality of possible modes of operation the programmable controller is to operate;

manual data entry means located remotely from said controller processor;

a program loader processor including:

(a) a microprocessor;

(b) a data bus coupled to said microprocessor;

(c) first input means coupled to said data bus and coupled to receive said mode control signals from said mode selector means;

(d) second input means coupled to said data bus and coupled to said manual data entry means to receive command data therefrom;

(e) input/output means coupled to said data bus and coupled to said controller memory for reading data out and writing data into said controller memory;

(f) output means coupled to said data bus and coupled to said mode control lines; and (g) memory means coupled to said data bus and being operable to store instructions which direct the microprocessor to perform a plurality of functions which include:

(1) inputting a first command data from said manual data entry means and in response thereto examining the mode indicated by said mode selector means to determine if it is in a selected one of its possible modes, and if it is, outputting signals through said output means to modify said mode control line signals and to thereby establish the mode in which the programmable controller is to operate; and (2) inputting second command data from said manual data entry means and in response thereto editing the control program stored in said programmable controller memory if said programmable controller is in another selected one of its possible modes of operation.

* * * * *

UNITED STATES PATENT AND TRADEMARK OFFICE
CERTIFICATE OF CORRECTION

PATENT NO. : 4,200,915
DATED : April 29, 1980
INVENTOR(S) : Odo J. Struger et al It is certified that error appears in the above—identified patent and that said Letters Patent is hereby corrected as shown below:

| | |
|---|---|
| Column 5, line 26 | After "memory 1." delete "p" The words "The program" should begin a new paragraph. |
| Column 13, line 67 | "decoded" should be -- decode -- |
| Column 22, line 37 (Claim 11 (c)) | after "means" insert -- through said mode control lines -- |

Signed and Sealed this

Twenty-third Day of September 1980

[SEAL]

Attest:

SIDNEY A. DIAMOND

Attesting Officer

Commissioner of Patents and Trademarks